Sept. 22, 1931.  W. J. CLUTHE  1,824,075
AUTOMATIC AIR LIFT
Filed Sept. 26, 1929  2 Sheets-Sheet 1
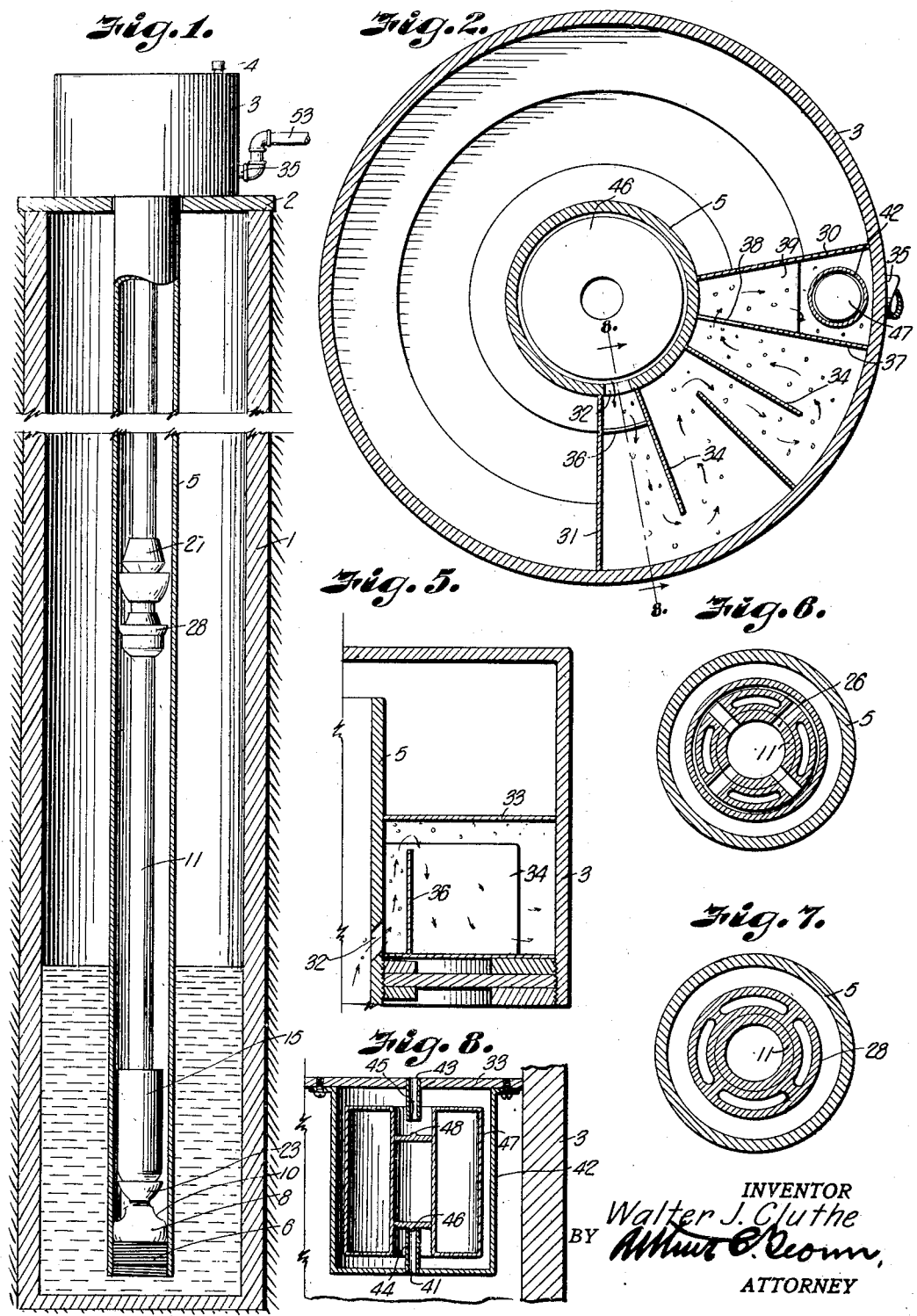
INVENTOR
Walter J. Cluthe
BY
ATTORNEY

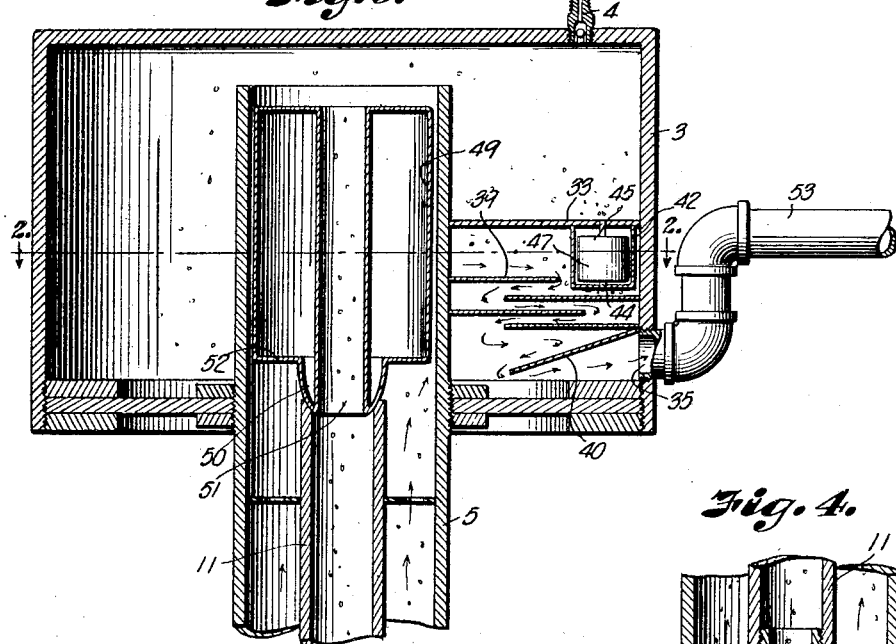
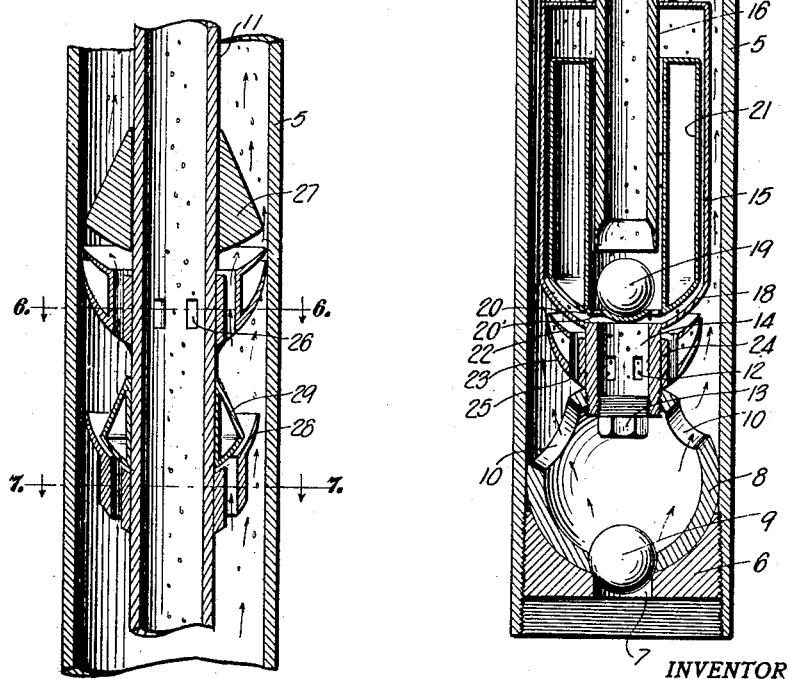

Patented Sept. 22, 1931

1,824,075

UNITED STATES PATENT OFFICE

WALTER J. CLUTHE, OF KANSAS CITY, MISSOURI

AUTOMATIC AIR-LIFT

Application filed September 26, 1929. Serial No. 395,300.

My invention relates to pumping apparatus, and more particularly to air lift apparatus wherein a pressure medium is employed for moving a liquid, the principal objects of my invention being to conserve the energy of the pressure medium, to separate a gas pressure medium from liquid pumped thereby and to control the operation of air lift apparatus responsively to the extent to which liquid is being delivered by the apparatus for reducing the hazard of damage to containers and interference with the functioning of the pressure medium.

Air lift apparatus ordinarily includes a pressure medium tube extending in a liquid conduit and having suitable ports for delivering the pressure medium to the conduit. Further objects of my invention are to enhance the lifting effect of the pressure medium delivered to the conduit, restrain water from passing into the pressure medium tube, to automatically effect closing of the lower end of the tube to prevent flow of liquid in the tube, and to enable liquid passing toward the tube to close the lower end thereof.

Further objects of the invention are to effect automatic suspension of the influence of a pressure medium when the liquid rises beyond a predetermined point in the conduit and to prevent outflow of the pressure medium with the liquid for conserving the supply of pressure medium constantly effective for lifting the liquid.

In accomplishing these and other objects of the invention, I have provided improved details of structure, the preferred forms of which are illustrated in the accompanying drawings, wherein:

Fig. 1 is a vertical section of a well equipped with my improved air lift apparatus.

Fig. 2 is a cross section of a compressed air tank and separating compartment therein at the upper end of the well on the line 2—2, Fig. 3.

Fig. 3 is a vertical central section of the tank and upper end portions of the conduits illustrating accessory jet members.

Fig. 4 is a vertical central section of the lower end of the liquid and pressure medium conduits illustrating valves and jet members controlling flow of pressure medium and liquid.

Fig. 5 is a fragmentary vertical section of the compressed air tank including the liquid inlet portion of a separating chamber.

Fig. 6 is a section on the line 6—6, Fig. 3.

Fig. 7 is a section on the line 7—7, Fig. 3.

Fig. 8 is an enlarged detail section of a float housing in the separating chamber and valves for controlling flow of fluid from the chamber to the tank.

Referring in detail to the drawings:

1 designates a well having a body of liquid at its lower end which is to be drawn on either steadily or intermittently, the well being covered by a top 2 having sufficient strength to support the apparatus presently described.

Mounted on the well is a tank 3 adapted to retain gas under relatively high pressure and having an inlet 4 for supplying gas thereto.

Extending upwardly into the tank and downwardly to a point adjacent the bottom of the well is a liquid conduit 5 having an open upper end communicating with the tank and a bottom end closed by a plug 6. An axial opening 7 in the plug forms a liquid intake port. The plug has a concave upper surface forming a seat for a globular valve cage 8 adapted to support a ball valve 9 in the port 7 and having angularly directed openings 10 for passage of liquid upwardly in the conduit.

Extending in the conduit is a pressure medium supply pipe 11 having its upper end spaced below the upper end of the conduit and its lower end engaged with and supporting the valve cage 8.

The pipe is provided with an annular series of vertically elongated ports 12 at its lower end and with a plug 13 shutting the pipe off from the globular valve cage whereby the pressure medium passing downwardly in the pipe is delivered laterally into the conduit above the cage for lifting or propelling liquid upwardly in the conduit.

The ports 12 are preferably formed in a nipple 14 depending from the lower end of a tubular housing 15 having substantially larger diameter than the pipe and screwthreadedly connected therewith.

The housing structure preferably includes a tubular pipe extension 16 screwthreaded in the pipe, the housing encircling a portion of the extension and having an upper flange 17 fixed to the extension. A lower arcuate housing flange 18 receives the nipple, the lower end of the extension being spaced from the lower end of the housing for accommodating a float operated ball valve 19 as presently described.

Vertically movable in the space between the nipple and the lower end of the pipe extension is a spider-like support 20 having a ring of openings 20' and a central concave imperforate seat for the ball 19 which is adapted to be elevated by liquid passing through the ports 12 into the nipple toward the pipe for closing the lower end of the extension and preventing liquid from passing upwardly into the presure medium pipe.

The valve is float operated and includes a hollow annular float 21 movable in the annular space between the housing and the extension 16, and the ball supporting spider comprises a bracket extending across the opening at the lower end of the annular float. Pressure medium passing downwardly in the pipe is therefore not obstructed by the ball but passes around the ball through the apertures of the spider and into the nipple 14 for flow through the ports 12.

The pressure medium is further conditioned and controlled for delivery to the conduit by a pair of spaced disks 22 and 23 fixed to the outer wall of the nipple above and below the series of ports 12. The disks are concave and differentially curved to form converging walls producing a relatively narrow annular outlet between the peripheries of the disks. An annular jet of pressure medium is thus produced which is directed upwardly and creates a vacuum below the disks for drawing air and liquid through the ports 10, unseating the valve 9, and drawing liquid through the ports 7 from the well.

The disks 22 and 23 may be formed integrally on a collar 24 adapted to be mounted on the nipple and having apertures registering with the ports 12. The body comprising the collar and pair of disks may be provided with channels 25 wherethrough liquid may move upwardly in the conduit adjacent the nipple and thus enhance the efficiency of the pressure medium for exerting lifting influence on the liquid.

Supplemental jet members may be distributed along a pressure medium pipe when the liquid is to be moved a considerable distance. A supplemental jet member illustrated in Fig. 3 is located in communicating relation with ports 26 in the pipe, and is adapted to be operable only when pressure in the pipe exceeds a predetermined value. The supplemental lifting means becomes effective only when the pressure delivered through the lower ports is not sufficient to lift the liquid to the outlet, and resistance of the weight of liquid in the conduit causes pressure to be built up in the pipe.

The disks of the jet members are relatively elastic, and the peripheral edge of the upper disk normally engages the edge of the lower disk and prevents flow of the pressure medium from the ports into the area between the pipe and the conduit.

A weight 27 slidably mounted on the pipe above the supplemental jet member tends to retain the upper disk in sealing relation with the lower disk, the weight and jet member being adjusted to yield to predetermined pressure for rendering the jet member effective. The weight normally rests on the upper disk and presses the disk edges together for controlling flow of gas through the jet member. The weight may further be adapted to respond to pressure of fluid passing through the vertical channels in the body of the jet member, and when seated will close the channels but will yield when pressure of the liquid urged by the pressure medium delivered through the lower ports 12 reaches a predetermined value.

The edges of the jet member disks preferably engage the wall of the conduit.

A second type of jet member located below the above described member on an imperforate portion of the pipe 11 has a single disk or wing 28 and is curved to extend at a relatively acute angle to the pipe to form a seat for a float 29 normally closing the vertical channels in the body thereof.

The edge of the lower supplemental member shown in Fig. 3 is spaced from the conduit to afford relatively free flow of liquid.

The apparatus herein illustrated representing my invention is especially adapted for providing continuously operable air lift apparatus made effective for functioning upon opening of an exhaust or liquid delivery valve. It is therefore desirable both to prevent escape of the pressure medium and to prevent building up of excessive pressure by the liquid in the apparatus.

In order to separate the pressure medium from the liquid, I provide a closed chamber in the tank formed by radial vertical partition walls 30 and 31 having inner vertical edges sealingly fixed to the outer surface of the projecting end of the conduit and opposite vertical edges sealingly fixed to the wall of the tank. An outlet port 32 from the conduit is located within the chamber adjacent the chamber wall 31 and the bottom of the tank. The walls extend part way from the floor of the tank to the upper end edge of the conduit. A cover 33 is mounted on the upper edges of the partitions and the chamber is thus sealed from the tank.

A plurality of vertical baffles 34 extend laterally in staggered relation alternately from the conduit and the tank wall and have upper edges spaced from the cover 33, thus forming a tortuous horizontal path for the movement of the mixture of gas and liquid from the chamber inlet 32 toward an outlet 35 at the bottom edge of the tank wall.

The baffle adjacent the chamber wall 31 extends on the opposite side of the port 32 from said wall to form an inlet chamber. A cross plate 36 having vertical edges fixed to the wall 31 and adjacent baffle close to the port has an upper edge located below the edge of the baffle to form a weir-like wall in the inlet chamber and produce a relatively small channel through which liquid entering the port from the conduit moves upwardly and over the edge of the wall 36 toward the outer edge of the baffle.

A third partition 37 extends across the space between the conduit and the tank wall on the opposite side of the outlet 35 from the partition 30, forming therewith a compartment and having a notch or passage 38 in its upper edge adjacent the conduit whereby liquid freed from gas during its movement through the tortuous passage may move through the partition into the compartment and flow thence toward the outlet 35.

The liquid flows downwardly over staggered horizontal vertically spaced shelves 39 extending alternately from the conduit and the tank wall, the ends of adjacent shelves overlapping to form a trap-like tortuous passage. A final trap or baffle member 40 extends downwardly forwardly in front of the outlet 35, to locate the inner edge thereof adjacent the floor of the tank and force outgoing liquid to pass in a thin stream or sheet over the floor to the outlet.

Gas departing from the mixture in the chamber collects at the upper end of the chamber and may have access to a lower port 41 in a float housing 42 depending from the cover 33 and may move from the housing through an air outlet port 43 back into the tank. Nipples 44 and 45 are mounted in the respective ports to form valve seats.

The lower port in the housing is normally closed by a valve 46 on a float 47 located in the housing and responsive to pressure of air in the chamber. The upper port is normally open but may be closed by a valve 48 on said float, the valves 46 and 48 being adapted to engage respectively the seats 44 and 45. Pressure of air in the chamber may lift the float to permit air to pass through the housing without closing the upper port.

Liquid accumulating to an excessive extent in the chamber and entering the housing will lift the float and close the air outlet port 43 to prevent flow of liquid into the tank.

In order to suspend operation of the apparatus when the chamber is full of liquid and the exhaust outlet 35 is closed, a float 49 is mounted on the upper end of the pipe including a depending axial valve portion 50 adapted to seat in the upper end of the pipe and having an axial channel 51 through which the pressure medium may pass from the tank into the pipe.

The float is freely movable vertically in the conduit and has a lower surface formed to guide the mixture of gas and liquid into the outlet of the conduit. A horizontal bottom flange 52 of the float is located slightly above the outlet 32 when the float is seated on the pipe so that when liquid rises in the conduit above the outlet, the float will be elevated and displaced from the upper end of the pipe to permit the liquid to flow into the pipe and thus effect drainage from the chamber. A valved liquid delivery pipe 53 is connected to the tank at the exhaust outlet 35.

In using apparatus constructed as described, the tank is supplied with air under desired pressure adapted to effect the lifting action on the liquid. The air passes through the float 49 into the pipe and thence through the lower ports and converging jet-forming disks into the conduit. The jet action draws liquid through the port 7 and ports 10 and moves the same upwardly through the outlet of the conduit into the chamber. When the exhaust outlet of the tank is open, liquid will be delivered under pressure.

The pressure medium is separated from the liquid in the chamber and may return to the tank when the pressure in the chamber exceeds the pressure in the tank. Liquid however, is prevented by the operation of the float valve in the housing from entering the tank to interfere with the body of compressed air therein.

Should excessive pressure result in filling the chamber above the predetermined level, the weighted float at the top of the pressure medium pipe will be lifted and the pipe thus made accessible to the liquid for relieving the chamber.

The pressure of the pressure medium, as well as the medium itself, is thus retained within the apparatus and hazard of damage or interference with operation of the apparatus is obviated.

Should the length of the conduit be such that supplemental air lift jet members may be desired, the weighted members are provided, adapted to limit out-flow of pressure medium from the pipes to the lower ports until resistance to the pressure medium due to elevation of a body of liquid in the lower end of the conduit results in spreading the disks or lifting the weights.

What I claim and desire to secure by Letters Patent is:

1. Automatic air lift apparatus including a liquid conduit, an air pipe extending in the conduit, a float housing at the lower end of the pipe, a nipple having lateral ports supported by the float housing and communicating therewith, a float operated valve responsive to liquid rising in the housing for closing the pipe, and means for delivering a pressure medium to the nipple.

2. Automatic air lift apparatus including a liquid conduit, an air pipe extending in the conduit, a float housing at the lower end of the pipe, a nipple having lateral ports supported by the float housing and communicating therewith, a float in said housing responsive to liquid entering the housing through said ports and having a valve for closing the pipe, and means for delivering a pressure medium through the pipe to the nipple.

3. Automatic air lift apparatus including a liquid conduit, an air pipe extending in the conduit, a float housing at the lower end of the pipe, a nipple having lateral ports supported by the float housing and communicating therewith, a valve cage depending from the nipple and sealed therefrom having valved liquid inlets and outlets to the conduit, a float operated valve responsive to liquid passing from the conduit through the nipple ports into the housing for closing the pipe, and means for delivering a pressure medium to the nipple.

4. Automatic air lift apparatus comprising a tank, a conduit provided with an outlet and having an upper end extending into the tank and a lower end provided with a valve seat, a pipe extending in the conduit, a float housing at the lower end of the pipe, a nipple at the lower end of the housing communicating therewith, said nipple having a closed lower end and lateral ports for discharging into the conduit air received through the housing, a valve cage at the lower end of the nipple adapted to rest in said seat, a float in said housing including a bottom provided with apertures for flow of air toward the nipple and having a valve, said float being operable by liquid passing upwardly through the housing to operate the valve for closing the lower end of the pipe.

5. In apparatus of the character described including a liquid conduit having an outlet spaced from its upper end, a pipe extending in the conduit, and means for delivering a pressure medium to the pipe for delivery to the lower end of the conduit to lift liquid therein, means including a float valve responsive to liquid rising in the pipe for closing the lower end of the pipe, and a float mounted on the upper end of the pipe responsive to liquid rising above said outlet for admitting liquid to the pipe for the purpose described.

6. In apparatus of the character described including a liquid conduit and a pressure medium pipe extending in the liquid conduit and provided with an annular series of lateral ports for delivering pressure medium to the conduit, a disk fixed to the pipe above the ports forming an annular nozzle for effecting jet delivery of air to the conduit.

7. In apparatus of the character described including a liquid conduit and a pressure medium pipe extending in the liquid conduit and provided with an annular series of lateral ports for delivering pressure medium to the conduit, a pair of disks mounted on the pipe respectively above and below the ports and having converging surfaces forming an annular nozzle for delivering the pressure medium in jet form to the conduit.

8. In apparatus of the character described including a liquid conduit and a pressure medium conduit extending in the liquid conduit and provided with an annular series of lateral ports for delivering pressure medium to the conduit, a collar having a vertical channel mounted on the pipe and provided with openings registering with said pipe ports, and disks on said collar above and below the ports and having converging surfaces forming an annular nozzle for delivering the pressure medium in jet form.

9. In apparatus of the character described including a liquid conduit and a pressure medium pipe extending in the liquid conduit having a lateral port for delivering the pressure medium to the conduit, a collar fixed to the pipe having an opening meeting with said port, a pair of resilient spaced disks on said collar above and below the port converging to form an annular jet opening, and means urging the upper disk against the lower for controlling flow of the pressure medium through the port to the conduit.

10. In apparatus of the character described including a liquid conduit and a pressure medium pipe extending in the liquid conduit having a lateral port for delivering the pressure medium to the conduit, a disk fixed to the pipe below the port having an upwardly directed periphery, a second disk mounted on the pipe above the port, and a weight slidable on the pipe for urging the edge of the upper disk against the edge of the lower disk for controlling flow of the pressure medium through the port to the conduit.

In testimony whereof I affix my signature.

WALTER J. CLUTHE.